Patented Sept. 27, 1932

1,879,223

UNITED STATES PATENT OFFICE

MAX HARDTMANN, OF NAUNHOF, NEAR LEIPZIG, GERMANY, ASSIGNOR TO GENERAL ANILINE WORKS, INC., OF NEW YORK, N. Y., A CORPORATION OF DELAWARE

NEW AZODYESTUFFS

No Drawing. Application filed December 23, 1931, Serial No. 582,873, and in Germany January 3, 1931.

The present invention relates to new azodyestuffs, more particularly it relates to dyestuffs which may be represented by the probable general formula:

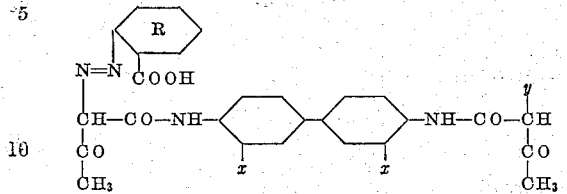

wherein the benzene nucleus R may be substituted by a sulfonic acid group, $x$ stands for hydrogen, alkyl, alkoxy or halogen and $y$ stands for hydrogen or the group

My new dyestuffs are obtainable by diazotizing in the usual manner with sodium nitrite in hydrochloric acid solution one or two molecular proportions of o-aminobenzoic acid which may be substituted by a sulfonic acid group, and introducing the diazo solution into one molecular proportion of a diacetoacetyl derivative of 4.4'-diaminodiphenyl which may be substituted in the 3.3'-positions by alkyl, alkoxy or halogen, the coupling being effected in sodaalkaline solution. In case, there are used two different diazotization components the diazo solution prepared from the molecular proportion of the second diazotization component is introduced when the coupling of the first diazotization component is complete.

From the solution the azodyestuffs are separated in the usual manner by salting out, filtered and dried. In form of their alkali metal salts they are generally yellowish powders, soluble in water, dyeing the vegetable fibre yellow shades which by after-treatment with a suitable copper compound, such as copper sulfate, become very fast to light and washing.

The invention is illustrated by the following examples, without being limited thereto:

*Example 1.*—217 parts by weight of 4-sulfo-2-aminobenzoic acid are diazotized in the usual manner with sodium nitrite and hydrochloric acid. The diazo solution thus obtained is introduced into a sodaalkaline solution prepared from 190 parts by weight of diacetoacetyl-o-tolidine, while stirring. When the coupling is complete, the dyestuff is salted out, filtered with suction and dried. In its free state it has the following formula:

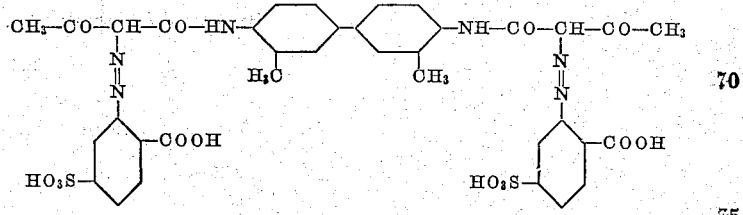

When treating cotton dyed with the dyestuff thus prepared in an aqueous copper sulfate solution a greenish yellow of excellent fastness to light and washing is obtained.

By substituting the 4-sulfo-2-aminobenzoic acid by the 5-sulfo-2-aminobenzoic acid, somewhat more reddish shades are obtained.

Likewise there is obtained a more reddish shade by substituting the diacetoacetyl-o-tolidine by the diacetoacetylbenzidine or by the diacetoacetyl-o-anisidine.

By substituting the diacetoacetyl-o-tolidine by the diacetoacetyl-o-chlorobenzidine a more greenish is obtained.

*Example 2.*—190 parts by weight of diacetoacetyl-o-tolidine are dissolved with 23 parts by weight of caustic soda with the addition of such a quantity of sodium acetate that the reaction remains weakly acetic acid during the following coupling. Into this solution a diazo solution prepared from 108.5 parts by weight of 4-sulfo-2-aminobenzoic acid are introduced with stirring. When the coupling is complete, excess soda is added and a diazo solution prepared from 68.5 parts by weight of 2-aminobenzoic acid are introduced. When the coupling is complete, the dyestuff is isolated in the usual manner. In its free state it has the following formula:

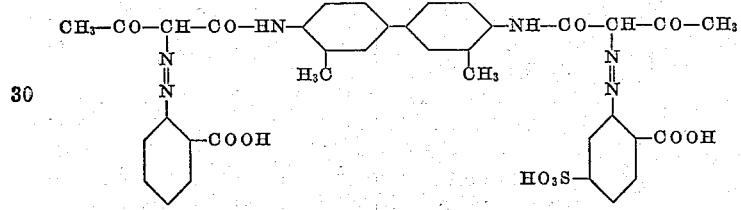

When treating cotton dyed with the dyestuff thus prepared with an agent yielding copper a greenish yellow is obtained of good fastness properties.

*Example 3.*—By coupling 190 parts by weight of diacetoacetyl-o-tolidine with a diazo compound prepared from 108.5 parts by weight of 5-sulfo-2-aminobenzoic acid in acetic acid solution, there is obtained a dyestuff having in its free state the following formula:

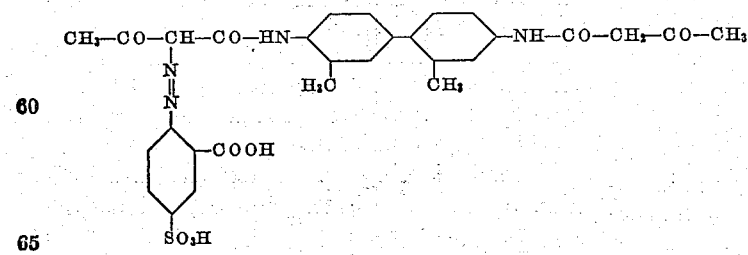

The dyestuff dyes cotton greenish yellow shades which by coppering become somewhat dull.

I claim:

1. As new products the azodyestuffs having in their free state the probable general formula:

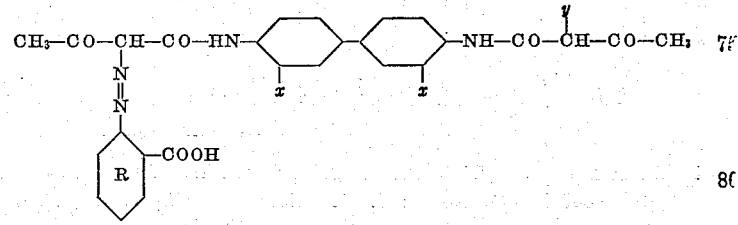

wherein the benzene nucleus R may be substituted by a sulfonic acid group, $x$ stands for hydrogen, alkyl, alkoxy or halogen and $y$ stands for hydrogen or the group

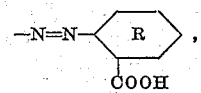

being in form of their alkali metal salts water soluble yellow powders, dyeing the vegetable fibre yellow shades which by after-coppering become fast to washing and light.

2. As a new product the dyestuff having in its free state the following formula:

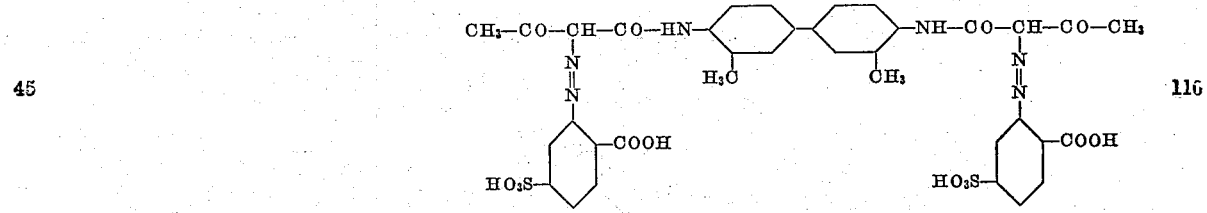

being in form of its alkali metal salts a water soluble yellow powder, dyeing the vegetable fibre yellow shades which by after-coppering become fast to washing and light.

3. As a new product the azodyestuff having in its free state the following formula:

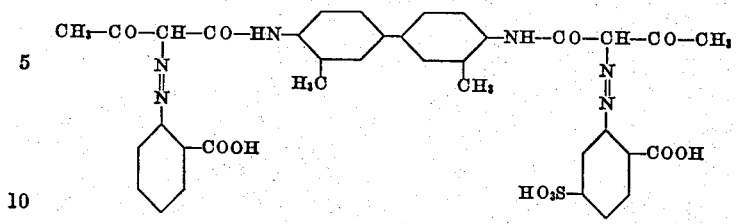

being in form of its alkali metal salts a water soluble yellow powder, dyeing the vegetable fibre yellow shades which by after-coppering become fast to washing and light.

4. As a new product the azodyestuff having in its free state the following formula:

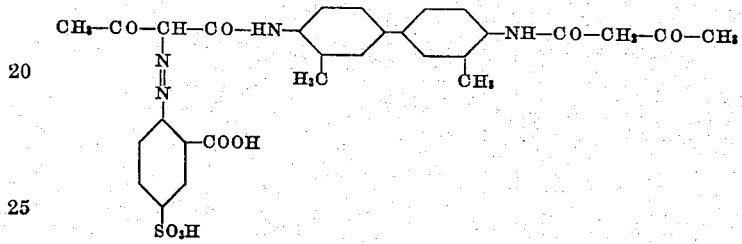

being in form of its alkali metal salts a water soluble yellow powder, dyeing the vegetable fibre greenish-yellow shades which by after-coppering becomes fast to washing and light.

In testimony whereof, I affix my signature.

MAX HARDTMANN.

Certificate of Correction

Patent No. 1,879,223.  September 27, 1932.

MAX HARDTMANN

It is hereby certified that error appears in the printed specification of the above-numbered patent requiring correction as follows: Page 2, after line 55, strike out the formula and insert instead—

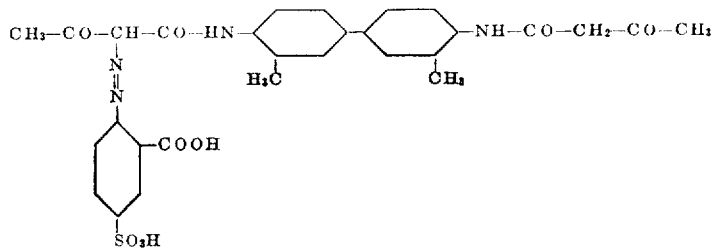

and that the said Letters Patent should be read with this correction therein that the same may conform to the record of the case in the Patent Office.

Signed and sealed this 27th day of December, A. D. 1932.

[SEAL.] M. J. MOORE,
*Acting Commissioner of Patents.*